United States Patent
Tsai et al.

(10) Patent No.: US 7,092,323 B2
(45) Date of Patent: Aug. 15, 2006

(54) MULTI-STAGE FOCUS CONTROL SYSTEM AND METHOD

(75) Inventors: Chin-Yin Tsai, Taipei (TW); Keng-Lon Lei, Taipei (TW)

(73) Assignee: Via Optical Solution, Inc., Shindian (TW)

(*) Notice: Subject to any disclaimer, the term of this patent is extended or adjusted under 35 U.S.C. 154(b) by 468 days.

(21) Appl. No.: 10/246,825

(22) Filed: Sep. 19, 2002

(65) Prior Publication Data

US 2003/0156509 A1 Aug. 21, 2003

(30) Foreign Application Priority Data

Feb. 19, 2002 (TW) .............................. 91102808 A

(51) Int. Cl.
*G11B 7/95* (2006.01)

(52) U.S. Cl. .................................. 369/44.29; 369/53.23

(58) Field of Classification Search ............. 369/44.35, 369/44.36, 44.37, 44.29, 44.28, 53.23
See application file for complete search history.

(56) References Cited

U.S. PATENT DOCUMENTS

| | | | | |
|---|---|---|---|---|
| 4,497,047 A * | 1/1985 | Fujiie et al. ............. | 369/44.25 |
| 4,512,004 A * | 4/1985 | Nonaka ................... | 369/44.28 |
| 5,347,501 A * | 9/1994 | Iimura ..................... | 369/44.25 |
| 5,384,762 A * | 1/1995 | Kagami et al. .......... | 369/44.28 |
| 5,602,689 A * | 2/1997 | Kadlec et al. ............ | 360/78.04 |
| 5,953,296 A * | 9/1999 | Baba ....................... | 369/44.32 |
| 6,246,647 B1 * | 6/2001 | Tsutsui et al. ........... | 369/44.29 |
| 6,301,212 B1 | 10/2001 | Kubo et al. | |
| 6,687,202 B1 * | 2/2004 | Watanabe et al. ........ | 369/44.34 |

* cited by examiner

*Primary Examiner*—Brian E. Miller
*Assistant Examiner*—Peter Vincent Agustin
(74) *Attorney, Agent, or Firm*—Madson & Austin

(57) ABSTRACT

A focus control system for an optical pickup head is provided. The optical head generates an electronic signal in response to an optical signal. The focus control system comprises a focusing error signal generator, a focus control signal generator and an actuator. The focus control signal generator is electrically connected to the focusing error signal generator, and includes a first, a second and a third compensators with a first, a second and a third gains, respectively, for generating a focus control signal with one of the first, second and third gains in response to the focusing error signal according to a corresponding one of a first, a second and a third operating modes of the optical pickup head. A method for controlling movement of an optical pickup head is also provided.

14 Claims, 3 Drawing Sheets

MULTI-STAGE FOCUS CONTROL SYSTEM AND METHOD

FIELD OF THE INVENTION

The present invention relates to a focus control system and a focus control method, and more particularly to a focus control system and a focus control method for an optical pickup head.

BACKGROUND OF THE INVENTION

Optical disks such as compact disks (CDs), video compact disks (VCDs) and digital versatile disk (DVDs) are able to be played by recording and reproducing apparatuses. When an optical pickup head of an optical disk drive operates, the light emitted by a light source such as a laser diode is focused by an object lens of the optical pickup head on an optical disk, and the light reflected by the optical disk is transmitted to a light sensor to realize information from the disk. Referring to FIG. 1, the optical pickup head 10 moves along two main directions, i.e. a direction perpendicular to the disk face, referred as a focusing direction F, and a direction parallel to the disk face, referred as a tracking direction T.

During operation, a focusing error and a tracking error usually arise on the rotating disk. The focusing error is generally caused by vibration of the disk in the focusing direction F, and the tracking error is caused by eccentricity of the disk in the tracking direction T. To correct these errors, a focus control system for an optical pickup head was developed, as can be seen in FIG. 2. The optical pickup head 20 has six light receiving parts A, B, C, D, E and F for producing output signals a, b, c, d, e and f, respectively, when receiving light reflected from the optical disk. The output signals e and f are amplified through a first pre-amplifier 21 to produce a tracking error signal TE. A difference between the summation of signals a and c and that of signals b and d, i.e. (a+c)−(b+d), is amplified through a second pre-amplifier 22 to produce a focusing error signal FE. The focusing error FE is processed by a digital signal processor (DSP) 23 to generate a focus control signal Foo to an actuator 24. The actuator 24 provides a moving force for actuating a trace shift of the optical pickup head 20 in the tracking direction accordingly.

The digital signal processor 23 includes a first compensator 231 and a second compensator 232 for complying with various operational statuses. The first compensator 231 has a normal gain, while the second compensator 232 has a high gain. When the optical pickup head 20 has completed a focusing operation and is situated in either a tracking condition or a seeking condition, the first compensator 231 with the normal gain is selected for generating the focus control signal Foo in order to maintain the focusing result. The term "tracking condition" used herein means that the position of the optical pickup head with respect to the tracks is maintained in the proper center position above the selected track. The term "seeking condition" means that the optical pickup head jumps from one track to another track. On the other hand, before the focusing operation of the optical pickup head 20 is completed, the second compensator 232 with the high gain is selected for generating the focus control signal Foo in order to speed up the focusing operation. Such focus control strategy essentially provides good focusing operation of the optical pickup head 20. Unfortunately, in practice, when the optical pickup head 20 has completed a focusing operation and is situated in the seeking condition, the focusing error signal FE is usually unstable due to the production of noise. Therefore, the first compensator 231 is insufficient to provide an appropriate tuning, which becomes problematic in a high-speed and high-precision optical disk.

SUMMARY OF THE INVENTION

Therefore, the present invention provides a focus control apparatus and a focus control method for an optical pickup head to properly adjust the position of the optical pickup head, in which a focus control signal is generated in response to a focusing error signal that is more specific to various operating modes of the optical pickup head, so as to overcome the above problems.

In accordance with an aspect of the present invention, there is provided a focus control system for an optical pickup head. The optical head generates an electronic signal in response to an optical signal. The focus control system comprises a focusing error signal generator, a focus control signal generator and an actuator. The focusing error signal generator is electrically connected to the optical pickup head for generating a focusing error signal in response to the electronic signal from the optical pickup head. The focus control signal generator is electrically connected to the focusing error signal generator, and includes a first, a second and a third compensators with a first, a second and a third gains, respectively, for generating a focus control signal with one of the first, second and third gains in response to the focusing error signal according to a corresponding one of a first, a second and a third operating modes of the optical pickup head. The actuator is employed for providing a moving force to actuate the optical pickup head along a focusing direction in response to the focus control signal.

In an embodiment, the first compensator is selected to output the focus control signal with the first gain in the first operating mode when the optical pickup head completes a focusing operation and is situated in a tracking condition. The second compensator is selected to output the focus control signal with the second gain in the second operating mode when the optical pickup head completes a focusing operation and is situated in a seeking condition, and the second gain is larger than the first gain. The third compensator is selected to output the focus control signal with the third gain in the third operating mode when the optical pickup head has not completed a focusing operation, and the third gain is larger than the second gain.

In accordance with another aspect of the present invention, there is provided a focus control apparatus for an optical pickup device. The optical pickup device includes an optical pickup head for picking up data of a disk and an actuator for actuating the optical pickup head to reach a proper position with respect to the disk. The focus control apparatus comprises a focusing error signal generator and a focus control signal generator. The focusing error signal generator generates a focusing error signal according to a location of the optical pickup head with respect to the disk. The focus control signal generator is electrically connected to the focusing error signal generator and includes a first compensator, a second compensator and a third compensator selected to output a focus control signal with a selected one of first, a second and a third gains to the actuator in response to the focusing error signal in order to move the optical pickup head under the selected gain. In accordance with the present invention, the first compensator, the second compensator and the third compensator are selected in cases that the optical pickup head completes a focusing operation and is situated in a tracking condition, that the optical pickup head completes a focusing operation and is situated in a seeking condition, and that the optical pickup head has not completed a focusing operation, respectively.

In an embodiment, the second gain is larger than the first gain, and the third gain is larger than the second gain. The electronic signal responsive to an optical signal received by the optical pickup head and indicative of the location of the optical pickup head with respect to the disk is inputted to the focusing error signal generator to generate the focusing error signal.

In accordance with another aspect of the present invention, there is provided a method for controlling movement of an optical pickup head. The method comprises steps of generating a focusing error signal in response to electronic signals from the optical pickup head, generating a focus control signal in response to the focusing error signal and either one of a first, a second and a third gains selected according to a first, a second and a third operating modes of the optical pickup head, respectively, and providing a moving force to actuate a trace shift of the optical pickup head along a focusing direction in response to the focus control signal.

In an embodiment, the first gain, the second gain and the third gain are selectively used in the first operating mode when the optical pickup head completes a focusing operation and is situated in a tracking condition, in the second operating mode when the optical pickup head completes a focusing operation and is situated in a seeking condition, and in the third operating mode the optical pickup head has not completed a focusing operation, respectively. The second gain is larger than the first gain, and the third gain is larger than the second gain.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
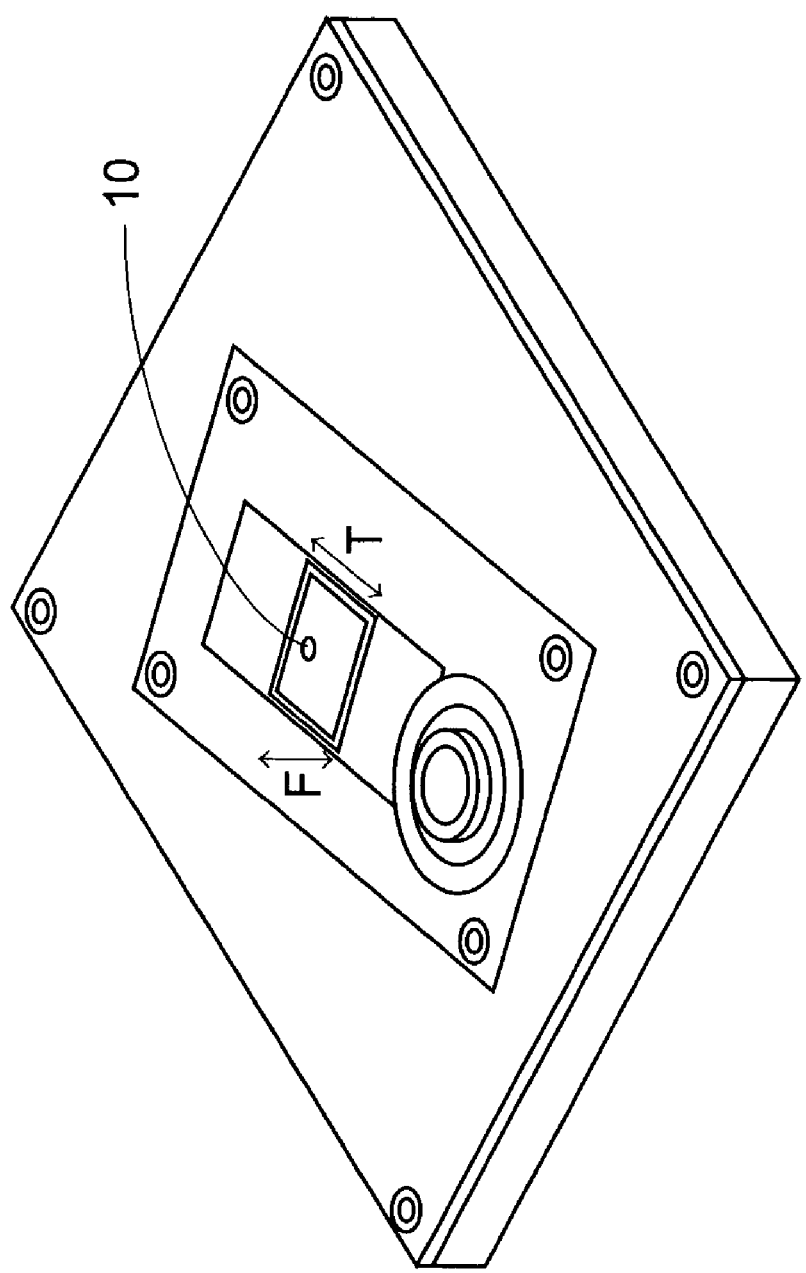
FIG. 1 schematically illustrates a typical optical pickup head conventionally used.
Figure 2:
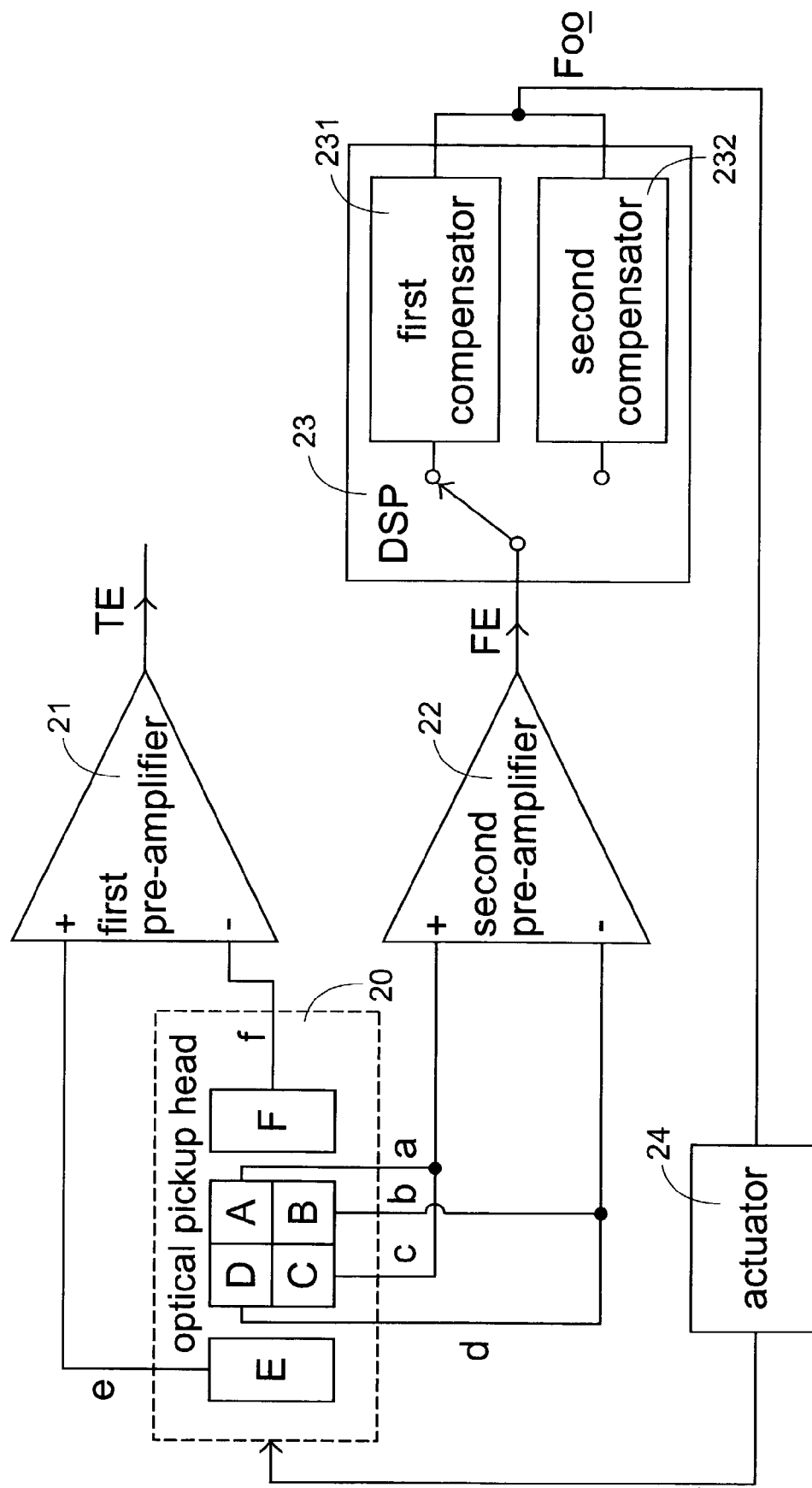
FIG. 2 is a functional block diagram illustrating a conventional focus control system for an optical pickup head.
Figure 3:
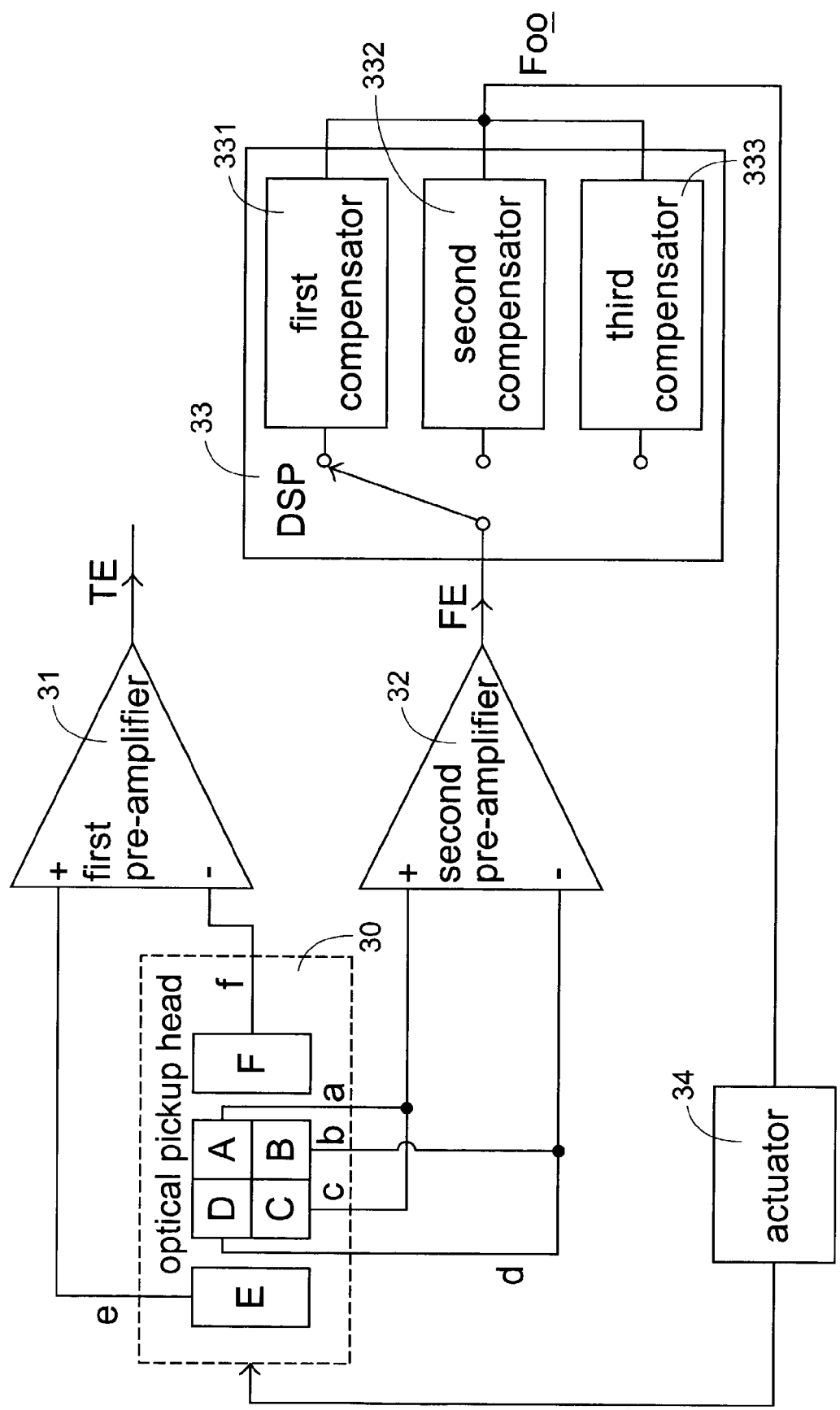
FIG. 3 is a functional block diagram illustrating a conventional focus control system for an optical pickup head according to a preferred embodiment of the present invention.

Please refer to FIG. 3. The focus control system for an optical pickup head 30 according to the present invention principally comprises a pre-amplifier 32, a digital signal processor 33 and an actuator 34. In accordance with the present invention, the digital signal processor 33 includes three compensators with different gains.

The optical pickup head 30 has six light receiving parts A, B, C, D, E and F for producing output signals a, b, c, d, e and f, respectively, when receiving light reflected from the optical disk. The output signals e and f are amplified through another pre-amplifier 31 to produce a tracking error signal TE. A difference between the summation of signals a and c and that of signals b and d, i.e. (a+c)−(b+d), is amplified through the pre-amplifier 32 to produce a focusing error signal FE. The focusing error FE is processed by the digital signal processor 33 to generate a focus control signal Foo to the actuator 34.

The digital signal processor 33 includes a first compensator 331, a second compensator 332 and a third compensator 333 with a low gain, a medium gain and a high gain, respectively. With such configuration, the focus control signal Foo with one of the three gains is generated in response to the focusing error signal FE according to a corresponding one of a first, a second and a third operating modes of the optical pickup head 30.

The control strategy according to the present focus control system will be illustrated as follows. For example, the first compensator 331 is selected to output the focus control signal Foo with the low gain in the first operating mode when the optical pickup head 30 completes a focusing operation and is situated in a tracking condition. The second compensator 332 is selected to output the focus control signal Foo with the second gain in the second operating mode when the optical pickup head 30 completes a focusing operation and is situated in a seeking condition. The third compensator 333 is selected to output the focus control signal Foo with the high gain in the third operating mode when the optical pickup head 30 has not completed a focusing operation.

Since the medium gain is employed for generating the focus control signal Foo when the optical pickup head 30 completes a focusing operation and is situated in a seeking condition, the problem of improper tuning occurs in the prior art will be highly reduced. Thus, with the focus control system of the present invention, the position of the optical pickup head can be properly adjusted, because the focusing error signal is more specific to various operating modes of the optical pickup head.

The present invention is illustrated by referring to an optical disk drive. Nevertheless, the present invention can be applied to a general optical pickup device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A focus control system for an optical pickup head, comprising:
    a focusing error signal generator electrically connected to said optical pickup head for generating a focusing error signal in response to an electronic signal from said optical pickup head;
    a focus control signal generator electrically connected to said focusing error signal generator, and including a first, a second and a third compensators with a first, a second and a third gains, respectively, for generating a focus control signal with one of said first, second and third gains in response to said focusing error signal according to a corresponding one of a first, a second and a third operating modes of said optical pickup head; and
    an actuator moving said optical pickup head in response to said focus control signal;
    wherein said second compensator is selected to output said focus control signal with said second gain in said second operating mode when said optical pickup head completes a focusing operation and is situated in a seeking condition, and said second gain is larger than said first gain.

2. The focus control system according to claim 1 wherein said first compensator is selected to output said focus control signal with said first gain in said first operating mode when said optical pickup head completes a focusing operation and is situated in a tracking condition.

3. The focus control system according to claim 1, wherein said third compensator is selected to output said focus control signal with said third gain in said third operating mode when said optical pickup head has not completed a focusing operation, and said third gain is larger than said second gain.

4. The focus control system according to claim 1, wherein said focusing error signal generator includes a pre-amplifier.

5. The focus control system according to claim 1, wherein said focus control signal generator is a digital signal processor (DSP).

6. The focus control system according to claim 1, wherein said optical pickup head is included in an optical disk drive.

7. A method for controlling movement of an optical pickup head, comprising steps of:
   generating a focusing error signal in response to electronic signals from said optical pickup head;
   generating a focus control signal in response to said focusing error signal and either one of a first, a second and a third gains selected according to a first, a second and a third operating modes of said optical pickup head, respectively; and
   actuating a trace shift of said optical pickup head in response to said focus control signal;
   wherein said first gain, said second gain and said third gain are selectively used in said first operating mode when said optical pickup head completes a focusing operation and is situated in a tracking condition, in said second operating mode when said optical pickup head completes a focusing operation and is situated in a seeking condition, and in said third operating mode when said optical pickup head has not completed a focusing operation, respectively.

8. The method according to claim 7 wherein said second gain is larger than said first gain, and said third gain is larger than said second gain.

9. A focus control system for controlling an optical pickup head, comprising:
   a focusing error signal generator electrically connected to said optical pickup head for generating a focusing error signal;
   a focus controller generating a focus control signal, electrically connected to said focusing error signal generator to control said optical pickup head, wherein said focus controller comprises:
   a first compensator for generating said focusing control signal by a first gain during a first operating mode;
   a second compensator for generating said focusing control signal by a second gain during a second operating mode;
   a third compensator for generating said focusing control signal by a third gain during a third operating mode;
   wherein said second compensator is selected to output said focus control signal with said second gain in said second operating mode when said optical pickup head completes a focusing operation and is situated in a seeking condition, and said second gain is larger than said first gain.

10. The focus control system according to claim 9, wherein said first compensator is selected to output said focus control signal with said first gain in said first operating mode, when said optical pickup head completes a focusing operation and is situated in a tracking condition.

11. The focus control system according to claim 9, wherein said third compensator is selected to output said focus control signal with said third gain in said third operating mode when said optical pickup head has not completed a focusing operation, and said third gain is larger than said second gain.

12. The focus control system according to claim 9, wherein said focusing error signal generator includes a pre-amplifier.

13. The focus control system according to claim 9, wherein said focus control signal generator is a digital signal processor (DSP).

14. The focus control system according to claim 9, wherein said optical pickup head is included in an optical disk drive.

* * * * *

UNITED STATES PATENT AND TRADEMARK OFFICE
CERTIFICATE OF CORRECTION

PATENT NO. : 7,092,323 B2 Page 1 of 1
APPLICATION NO. : 10/246825
DATED : August 15, 2006
INVENTOR(S) : Chin-Yin Tsai et al.

It is certified that error appears in the above-identified patent and that said Letters Patent is hereby corrected as shown below:

Column 1, lines 54 and 63, replace "foo" with --fo<u>o</u>--.

Column 4, lines 2, 8, 15, 19, 23, and 27, replace "foo" with --fo<u>o</u>--.

Signed and Sealed this

Nineteenth Day of December, 2006

JON W. DUDAS
*Director of the United States Patent and Trademark Office*